United States Patent [19]

Treuner

[11] 3,880,907
[45] Apr. 29, 1975

[54] ARYLSULFONYLFORMAMIDOXIMES
[75] Inventor: Uwe D. Treuner, Regensburg, Germany
[73] Assignee: E. R. Squibb & Sons, Inc., Princeton, N.J.
[22] Filed: Mar. 16, 1973
[21] Appl. No.: 342,019

Related U.S. Application Data
[62] Division of Ser. No. 190,693, Oct. 19, 1971, Pat. No. 3,736,356.

[52] U.S. Cl. .............. 260/470; 260/518; 424/248; 424/250; 424/267; 424/309; 424/319; 424/324; 424/326
[51] Int. Cl. .................. C07c 147/06; C07c 147/12
[58] Field of Search ............ 260/470, 518 R, 518 A

[56] References Cited
UNITED STATES PATENTS
3,354,174  11/1967  Bell .................................. 260/309.2
3,420,847  1/1969  Bell .................................. 260/326.3

FOREIGN PATENTS OR APPLICATIONS
2,248,941  10/1973  Germany

Primary Examiner—John F. Terapane
Attorney, Agent, or Firm—Lawrence S. Levinson; Merle J. Smith

[57] ABSTRACT

Arylsulfonylformamidoximes of the general formula

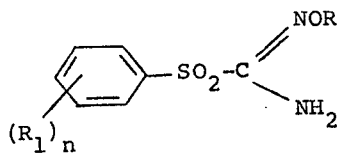

are useful as antimicrobial agents, hypoglycemic agents and antiinflammatory agents.

6 Claims, No Drawings

ARYLSULFONYLFORMAMIDOXIMES

This application is a division of application Ser. No. 190,693, filed Oct. 19, 1971, now U.S. Pat. No. 3,736,356.

BRIEF SUMMARY OF THE INVENTION

This invention relates to new arylsulfonylformamidoximes having the general formula

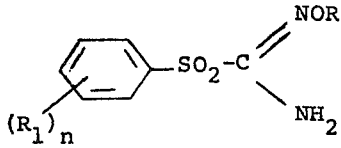

wherein R is hydrogen,
$CO(CH_2)_m R_2$
$CONH R_3$, or
$COCX_3$ $R_1$ is hydrogen, halogen, lower alkyl, lower alkanoylamido, $R_2$ is halogen, lower alkyl, COOH,
  COO-lower alkyl,
  S-lower alkyl, S-aryl,
  O-lower alkyl, O-aryl,
  $NH_2$, N-(lower alkyl)$_2$,
  NH(lower alkyl), NH-aryl, or

$R_3$ is phenyl or lower alkyl;
X is halogen;
Y is $CH_2$, O, S, NH or N-lower alkyl;
m is 1 to 4; and
n is 1 to 3
and salts of the basic, salt forming members.

DETAILED DESCRIPTION OF THE INVENTION

In formula I, the lower alkyl groups represented by the symbols are straight and branched chain aliphatic hydrocarbon radicals of up to eight carbon atoms such as methyl, ethyl, propyl, isopropyl, butyl, isobutyl, t-butyl, amyl and the like. The lower alkanoylamido groups contain the acyl radicals of the lower fatty acids, i.e., up to eight carbon atoms, including, for example, acetamido, propionamido, butyramido, isobutyramido and the like. The halogens are chlorine, bromine and iodine, preferably chlorine and bromine, especially the first. The aryl groups are monocyclic carbocyclic aryl, i.e., phenyl.

A preferred group of arylsulfonylformamidoximes within the above class have the formula

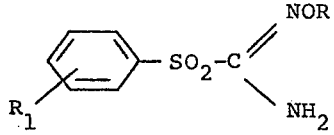

wherein R is hydrogen, $-CO(CH_2)_mR_2$, $-CONHR_3$ or $COCX_3$;

$R_1$ is hydrogen, halogen, lower alkyl especially methyl and ethyl) or lower alkanoylamido (especially acetamido);

$R_2$ is halogen (especially chlorine and bromine), lower alkyl (especially methyl and ethyl), COOH or COO-lower alkyl (especially $COOCH_3$ and $COOC_2H_5$);

$R_3$ is phenyl;
X is chlorine;
m is 1 or 2; and
n is 1.

The compounds of formula I wherein $R_2$ is a basic group form acid addition salts with the common organic and inorganic acids. Particularly these are compounds of formula I wherein $R_2$ is one of the nitrogen containing radicals.

These salts are acid addition salts formed from a variety of pharmaceutically acceptable inorganic and organic acids, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of formula I wherein R is hydrogen are produced from phenylsulfonyl cyanides of the formula

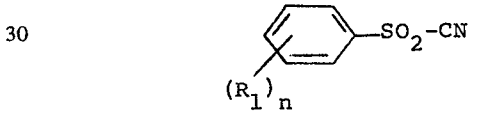

by treatment with hydroxylamine or a salt thereof, e.g., a hydrohalide such as the hydrochloride. The reaction is effected in an inert organic solvent, e.g., an alcohol such as ethanol, at about room temperature. If a hydroxylamine salt is used an alkali metal bicarbonate such as potassium bicarbonate is preferably present.

The phenylsulfonylformamidoxime, which is the product of the above reaction, may then be converted to a compound of the invention wherein R is other than hydrogen by reacting that product with an acid anhydride, as for example in Examples 5 and 6 which follow, or with acid halides or mixed acid ester halides as in Examples 7 and 8 which follow or with an isocyanate as in Example 10. The examples further illustrate the conditions of operation which are typical for the formation of those types of products.

The starting materials of formula III may be obtained by any of several methods available in the literature, e.g., a benzenesulfinic acid of the formula

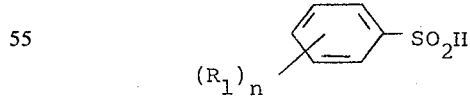

will react with phenyl cyanate, or a salt of a benzenesulfinic acid having the formula

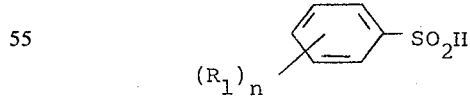

can be treated with cyanogen bromide, or a chloroperbenzoic acid of the formula

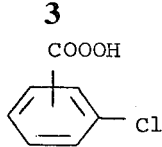

will react with a benzene or substituted benzene of the formula

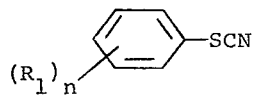

See, for example, Cox et al., Tetrahedron Letters No. 39, 3351–3352 (1969); Pews et al., Jour. Chem. Soc. (Sec D, Chem. Commun.) 1969, 1187.

The new compounds of Formula I are useful as antimicrobial agents and may be used to combat infections in animal species, such as mice, rats, dogs, guinea pigs and the like, due to organisms such as *Trichomonas vaginalis, Trichomonas foetus, Staphylococcus aureus, Salmonella schottmuelleri, Klebsiella pneumoniae, Proteus vulgaris, Escherichia coli* or *Trichophyton mentagrophytes*. For example, a compound or mixture of compounds of formula I or pharmaceutically acceptable acid addition salt (when formed) thereof may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The compounds of this invention are also hypoglycemic agents which are effective in lowering blood sugar content in mammalian species such as mice, rats, rabbits, dogs or the like in a manner analogous to tolbutamide. Some are particularly noteworthy in their long duration of action. For this purpose a compound or mixture of compounds of formula I, or non-toxic, physiologically acceptable acid addition salt (when formed) may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for accepted pharmaceutical practice.

The new compounds of this invention also have antiinflammatory properties and are useful as antiinflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or two to four divided doses, as indicated by the carageenan edema assay in rats. The active substance may be utilized in compositions such as tablets, capsules, solutions or suspensions containing up to about 300 mg. per unit of dosage of a compound or mixture of compounds of formula I or physiologically acceptable acid addition salt (when formed). They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be use.

The following examples are illustrative of the invention. All temperatures are expressed on the centigrade scale. Additional variations of the invention within the scope of formula I may be made according to the following procedures by suitable variations of the starting materials.

EXAMPLE 1

1-(Phenylsulfonyl)formamidoxime 0.76 g. (12 mmol.) of hydroxylamine hydrochloride are added to 1.6 g. (10 mmol.) of benzenesulfonyl cyanide in 15 ml. of absolute ethanol. The mixture is stirred at room temperature and 1.05 g. (12 mmole) of sodium bicarbonate are added in small portions. This is stirred for about 2 hours, the precipitate is filtered under suction and then washed thoroughly with water. The addition of water to the ethanolic filtrate yields additional product. The crude product is crystallized from n-butanol. 1 gm. of white crystalline 1-(phenylsulfonyl)formamidoxime is obtained, m.p. 108° (explosive).

EXAMPLE 2

1-(p-Chlorophenylsulfonyl)formamidoxime

White crystalline 1-(p-chlorophenylsulfonyl)formamidoxime, m.p. 73°–75° (dec.) is obtained by the procedure of Example 1 by substituting an equivalent amount of p-chlorophenylsulfonyl cyanide for the benezenesulfonyl cyanide.

EXAMPLE 3

1-(p-Toluenesulfonyl)formamidoxime

White benzenesulfonyl 1-(p-toluenesulfonyl)formamidoxime, m.p. 80°–83° (dec.) is obtained by the procedure of Example 1 by substituting an equivalent amount of p-toluenesulfonyl cyanide for the benezenesulfonyl cyanide.

EXAMPLE 4

1-[ (p-Acetamidophenyl)sulfonyl]formamidoxine

White crystalline 1-[ (p-acetamidophenyl)sulfonyl]-formamidoxime m.p., 150° (dec.) is obtained by the procedure of Example 1 by substituting an equivalent amount of (p-acetamidophenyl)sulfonyl cyanide for the benzenesulfonyl cyanide.

EXAMPLE 5

1-(Phenylsulfonyl)-O-(chloroacetyl)formamidoxime 2 g. (10 mmol.) of 1-(phenylsulfonyl)formamidoxime dissolved in 50 ml. of absolute tetrahydrofuran are treated with 1.9 g. (11 mmol.) of chloroacetic anhydride in 10 ml. of tetrahydrofuran. The temperature rises and a white precipitate of 1-(phenylsulfonyl)-O-(chloroacetyl)formamidoxime forms. After stirring for one-half hour, the product is filtered under suction, washed with ether and then crystallized from methyl glycol in the form of white needles, m.p. 190° (dec.), yield 2.8 g.

EXAMPLE 6

1-(Phenylsulfonyl)formamidoxime-O-succinic acid mono ester 2 g. (10 mmol.) of 1-(phenylsulfonyl)formamidoxime are dissolved in 50 ml. of dioxane and refluxed for 1 hour with 1.2 g. (12 mmol.) of succinic anhydride. The white product 1-(phenylsulfonyl)formamidoxime-O-succinic acid monoester, crystallizes and is recrystallized in the form of white crystals from methyl glycol, m.p. 176°–178°.

EXAMPLE 7

1-(Phenylsulfonyl)formamidoxime-O-malonic acid methyl ester 5 g. (25 mmol.) of 1-(phenylsulfonyl)formamidoxime are dissolved in 100 ml. of absolute dioxane, treated with 3.2 g. (40 mmol.) of pyridine and 5 g. (25 mmol.) of malonic acid methyl ester chloride are slowly added dropwise with stirring and cooling. The progress of the reaction is followed with thin layer chromatography. At the end of the reaction, the solvent is removed under vacuum and the residue is taken up with water, whereupon the product crystallizes. The product, 1-(phenylsulfonyl)formamidoxime-O-malonic acid methyl ester, is recrystallized from ethanol to obtain 2 g. of cream colored crystals, m.p. 156°–159° (dec.).

EXAMPLE 8

1-(Phenylsulfonyl)-O-(4-chlorobutyryl)formamidoxime 2.0 g. (10 mmol.) of 1-(phenylsulfonyl)formamidoxime and 0.8 g. (10 mmol.) of pyridine are dissolved in 50 ml. of tetrahydrofuran and 1.55 g. (11 mmol.) of 4-chlorobutyryl chloride are added slowly dropwise with stirring. After a short time, the product, 1-(phenylsulfonyl)-O-(4-chlorobutyryl)formamidoxime, crystallizes. It is recrystallized from methyl glycol to obtain 3 g. of white needles, m.p. 185° (dec.).

EXAMPLE 9

1-(Phenylsulfonyl)-O-(trichloroacetyl)formamidoxime
1-(Phenylsulfonyl)-O-(trichloroacetyl)formamidoxime, m.p. 160° (dec.) is obtained by the procedure of Example 5 by substituting an equivalent amount of trichloroacetic anhydride for the chloracetic anhydride.

EXAMPLE 10

1-(Phenylsulfonyl)formamidoxime-O-carbanilate 2 g. (20 mmol.) of 1-(phenylsulfonyl)formamidoxime are dissolved in 25 ml. of toluene treated with 1.2 g. of phenylisocyanate and refluxed for 1 hour. 1.9 g. of a white crystalline 1-(phenylsulfonyl)formamidoxime-O-carbanilate are obtained as a precipitate which is recrystallized from methyl glycol-water, m.p. 193° (dec.).

The following additional compounds are prepared by the method of Example 1 and 5 by substituting for the benzenesulfonyl cyanide the appropriately substituted analog in the procedure of Example 1 and then using the product thus obtained in the procedure of Example 5, substituting for the chloracetic anhydride the appropriately substituted acid anhydride

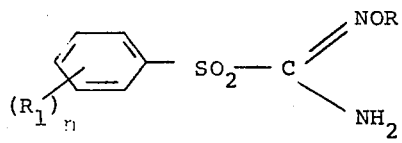

| Example | R | $R_1$ | n |
|---------|---|-------|---|
| 11 | $\underset{O}{\overset{\|\|}{C}}-CH_2-CH_3$ | H | 1 |
| 12 | $\underset{O}{\overset{\|\|}{C}}-CH_2-Br$ | H | 1 |
| 13 | $\underset{O}{\overset{\|\|}{C}}-CCl_3$ | p-$CH_3$ | 1 |
| 14 | $\underset{O}{\overset{\|\|}{C}}-CH_2-COOC_2H_5$ | H | 1 |
| 15 | $\underset{O}{\overset{\|\|}{C}}-CH_2-COOC_2H_5$ | p-$CH_3$ | 1 |
| 16 | $\underset{O}{\overset{\|\|}{C}}-CH_2-COOC_2H_5$ | p-$C_2H_5CONH$ | 1 |

—Continued

| Example | R | $R_1$ | n |
|---|---|---|---|
| 17 | $\underset{O}{\overset{\parallel}{C}}-CH_2-COOCH_3$ | p-Cl | 1 |
| 18 | $\underset{O}{\overset{\parallel}{C}}-CH_2-OC_2H_5$ | 3,4,5-$CH_3$ | 3 |
| 19 | $\underset{O}{\overset{\parallel}{C}}-CH_2-O-\text{C}_6\text{H}_5$ | p-$CH_3$ | 1 |
| 20 | $\underset{O}{\overset{\parallel}{C}}-CH_2-N\text{(morpholino)}O$ | H | 1 |
| 21 | $\underset{O}{\overset{\parallel}{C}}-CH_2-N\text{(piperazinyl)}N-CH_3$ | H | 1 |
| 22 | $\underset{O}{\overset{\parallel}{C}}-CH_2-Cl$ | p-$CH_3$-o-Cl | 2 |
| 23 | $\underset{O}{\overset{\parallel}{C}}-CH_2-N\text{(piperazinyl)}NH$ | | |
| 24 | $\underset{O}{\overset{\parallel}{C}}-NH-\text{C}_6\text{H}_5$ | o-$C_2H_5$ | 1 |
| 25 | $\underset{O}{\overset{\parallel}{C}}-CH_2-N\text{(thiomorpholino)}S$ | H | |
| 26 | $\underset{O}{\overset{\parallel}{C}}-CH_2-CH_2-S-CH_3$ | H | 1 |
| 27 | $\underset{O}{\overset{\parallel}{C}}-CH_2-CH_2-S-\text{C}_6\text{H}_5$ | H | 1 |
| 28 | H | 3,4,5-Cl | 3 |
| 29 | $\underset{O}{\overset{\parallel}{C}}-CH_2-NH_2$ | p-$CH_3$ | 1 (also HCl salt |
| 30 | $\underset{O}{\overset{\parallel}{C}}-CH_2-CH_2-NHC_2H_5$ | H | 1 |
| 31 | $\underset{O}{\overset{\parallel}{C}}-CH_2N(CH_3)_2$ | H | 1 |
| 32 | $\underset{O}{\overset{\parallel}{C}}-CHCH_3$ | H | 1 |
| 33 | $\underset{O}{\overset{\parallel}{C}}-NHC_2H_5$ | o,p-Cl | 2 |
| 34 | $\underset{O}{\overset{\parallel}{C}}-NH-\text{C}_6\text{H}_5$ | p-$CH_3$ | 1 |

What is claimed is:

1. A compound of the formula

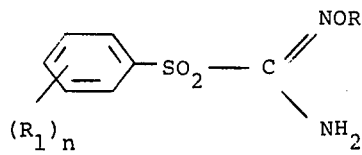

wherein R is $CO(CH_2)_mR_2$; $R_1$ is hydrogen, halogen, lower alkyl or lower alkanoylamido; $R_2$ is COOH or COO-lower alkyl; $m$ is 1 to 4; and $n$ is 1 to 3, and pharmaceutically acceptable salts thereof.

2. A compound as in claim 1 wherein $m$ is 1 or 2 and $n$ is 1.

3. A compound as in claim 1 wherein $R_2$ is COO-lower alkyl.

4. A compound as in claim 1 wherein R is —$COCH_2COOCH_3$, $R_1$ is hydrogen and $n$ is 1.

5. A compound as in claim 1 wherein $R_2$ is COOH.

6. A compound as in claim 1 wherein R is —$CO(CH_2)_2COOH$, $R_1$ is hydrogen and $n$ is 1.

* * * * *